(12) United States Patent
Carpenter et al.

(10) Patent No.: US 11,915,178 B2
(45) Date of Patent: Feb. 27, 2024

(54) CASCADING NOTIFICATION SYSTEM

(71) Applicant: nMetric, LLC, Costa Mesa, CA (US)

(72) Inventors: Tom Carpenter, Aliso Viejo, CA (US); William Turley, Newport Beach, CA (US); Christine Koski, Dallas, TX (US); Ryan Heaton, Castle Rock, CO (US)

(73) Assignee: nMetric, LLC, Dallas, TX (US)

( * ) Notice: Subject to any disclaimer, the term of this patent is extended or adjusted under 35 U.S.C. 154(b) by 883 days.

(21) Appl. No.: 14/861,531

(22) Filed: Sep. 22, 2015

(65) Prior Publication Data

US 2017/0083839 A1 Mar. 23, 2017

(51) Int. Cl.
*G06Q 10/0633* (2023.01)
*G06Q 10/0631* (2023.01)
*G06Q 10/0639* (2023.01)

(52) U.S. Cl.
CPC ... *G06Q 10/0633* (2013.01); *G06Q 10/06312* (2013.01); *G06Q 10/06395* (2013.01)

(58) Field of Classification Search
None
See application file for complete search history.

(56) References Cited

U.S. PATENT DOCUMENTS

| | | | |
|---|---|---|---|
| 6,006,016 A | 12/1999 | Faigon et al. | |
| 6,202,177 B1 | 3/2001 | Fujii | |
| 6,392,584 B1 * | 5/2002 | Eklund | G01M 15/12 341/183 |
| 6,404,880 B1 | 6/2002 | Stevens | |
| 6,526,044 B1 | 2/2003 | Cookmeyer, II et al. | |
| 6,577,988 B1 | 6/2003 | Travagline et al. | |
| 6,643,592 B1 * | 11/2003 | Loman | G06F 11/2257 702/35 |
| 6,694,362 B1 * | 2/2004 | Secor | G06Q 10/087 705/28 |
| 7,159,237 B2 | 1/2007 | Schneier et al. | |
| 7,328,260 B1 | 2/2008 | Muthiyan et al. | |
| 7,607,169 B1 | 10/2009 | Njemanze et al. | |

(Continued)

FOREIGN PATENT DOCUMENTS

| | | |
|---|---|---|
| JP | 08314761 | 11/1996 |
| JP | 10187498 | 7/1998 |

OTHER PUBLICATIONS

Integrated distributed intelligent system architecture for incidents monitoring and diagnosis, Ming Rao, Haibin Yang, Heming Yang, Intelligence Engineering Laboratory, Department of Chemical and Materials Engineering, The University of Alberta, Edmonton, Alberta, Canada (Year: 1998).*

(Continued)

*Primary Examiner* — Darlene Garcia-Guerra

(57) ABSTRACT

The inventive subject matter herein is directed toward improved scheduling and planning system that detects a problematic event in a workflow. When the event is detected, the system automatically notifies a set of contacts from a hierarchical contact list. The system then automatically notifies other sets of contacts depending upon the response from the first set of contacts. A cascade of different types of notifications could be triggered from a single detected event as each contact responds and provides information that could be used to trigger additional notifications.

14 Claims, 5 Drawing Sheets

(56) References Cited

U.S. PATENT DOCUMENTS

| | | | | |
|---|---|---|---|---|
| 7,675,638 B2* | 3/2010 | Czyszczewski | G06F 3/1204 | 358/1.14 |
| 8,020,481 B1* | 9/2011 | Beckwith | F41H 13/00 | 89/1.1 |
| 8,135,612 B1* | 3/2012 | Scudder | G06Q 40/04 | 705/7.14 |
| 8,762,190 B1* | 6/2014 | Solomon | G06Q 10/06311 | 705/7.13 |
| 9,043,014 B2* | 5/2015 | Ngo | G06F 3/126 | 700/226 |
| 9,753,455 B2* | 9/2017 | Drees | G06Q 10/06 | |
| 2002/0049738 A1* | 4/2002 | Epstein | G06F 16/951 | |
| 2002/0087882 A1* | 7/2002 | Schneier | G06F 21/552 | 726/23 |
| 2002/0107958 A1* | 8/2002 | Faraldo, II | H04L 41/00 | 709/224 |
| 2002/0123983 A1* | 9/2002 | Riley | G06Q 10/00 | |
| 2002/0174050 A1 | 11/2002 | Eynard et al. | | |
| 2003/0088534 A1* | 5/2003 | Kalantar | G06Q 10/06 | 706/50 |
| 2004/0030753 A1* | 2/2004 | Horvitz | G05B 19/404 | 709/206 |
| 2004/0088115 A1* | 5/2004 | Guggari | E21B 47/00 | 702/13 |
| 2004/0186927 A1* | 9/2004 | Eryurek | G05B 23/0283 | 710/12 |
| 2005/0034023 A1* | 2/2005 | Maturana | G05B 15/02 | 714/37 |
| 2005/0235660 A1* | 10/2005 | Pham | B23P 15/26 | 62/126 |
| 2006/0077607 A1* | 4/2006 | Henricks | G06Q 10/06 | 361/93.1 |
| 2006/0092019 A1 | 5/2006 | Fallon | | |
| 2006/0123428 A1* | 6/2006 | Burns | G06F 21/34 | 719/318 |
| 2006/0240803 A1* | 10/2006 | Valeriano | H04L 41/06 | 455/412.1 |
| 2006/0248147 A1* | 11/2006 | Hill | G06Q 10/107 | 709/206 |
| 2007/0012052 A1* | 1/2007 | Butler | G05D 23/1904 | 62/181 |
| 2007/0255805 A1 | 11/2007 | Beams et al. | | |
| 2007/0260410 A1* | 11/2007 | Raymond | G05B 21/02 | 702/81 |
| 2008/0046536 A1* | 2/2008 | Broda | H04L 67/2842 | 709/217 |
| 2008/0073440 A1* | 3/2008 | Butler | F24F 11/30 | 236/91 R |
| 2008/0080873 A1* | 4/2008 | Enzien | G03G 15/5079 | 399/8 |
| 2008/0133300 A1* | 6/2008 | Jalinous | G06Q 10/0635 | 705/7.28 |
| 2009/0054735 A1* | 2/2009 | Higgins | G16H 50/20 | 600/300 |
| 2009/0083577 A1* | 3/2009 | Carpenter | G06Q 10/06 | 714/26 |
| 2009/0204267 A1* | 8/2009 | Sustaeta | G06Q 10/04 | 700/36 |
| 2009/0228579 A1* | 9/2009 | Sanghvi | H04L 41/145 | 709/224 |
| 2009/0327429 A1* | 12/2009 | Hughes | G06Q 10/107 | 709/206 |
| 2010/0082129 A1* | 4/2010 | McGreevy | G06Q 10/06 | 700/80 |
| 2010/0318511 A1* | 12/2010 | Phan | G06Q 10/10 | 707/722 |
| 2011/0040660 A1* | 2/2011 | Allison | G06Q 10/087 | 705/28 |
| 2012/0022700 A1* | 1/2012 | Drees | G06Q 30/0283 | 700/276 |
| 2012/0042318 A1* | 2/2012 | Doan | G06Q 10/06315 | 718/103 |
| 2012/0072844 A1* | 3/2012 | Lefrancois des Courtis | G06Q 30/02 | 715/736 |
| 2012/0150334 A1* | 6/2012 | Arbogast | G05B 23/0254 | 700/110 |
| 2013/0197854 A1* | 8/2013 | Liao | G05B 23/0224 | 702/130 |
| 2013/0275539 A1* | 10/2013 | Gross | H04L 12/1895 | 709/206 |
| 2013/0317879 A1* | 11/2013 | Ukai | G06Q 10/0633 | 705/7.27 |
| 2014/0047107 A1* | 2/2014 | Maturana | H04L 43/04 | 709/224 |
| 2014/0195700 A1* | 7/2014 | Agarwal | G06F 13/26 | 710/48 |
| 2014/0282003 A1* | 9/2014 | Gruber | G06F 3/165 | 715/727 |
| 2014/0298100 A1* | 10/2014 | Grimm | G05B 19/4184 | 714/37 |
| 2014/0313032 A1* | 10/2014 | Sager | H04Q 9/00 | 340/539.17 |
| 2014/0337000 A1* | 11/2014 | Asenjo | G06F 17/5009 | 703/13 |
| 2014/0376410 A1* | 12/2014 | Ros | H04M 11/04 | 370/259 |
| 2015/0081376 A1* | 3/2015 | Cardone | G06Q 10/0633 | 705/7.27 |
| 2015/0120388 A1* | 4/2015 | Tan | H04W 4/21 | 705/7.32 |
| 2015/0137968 A1* | 5/2015 | Rusin | G08B 25/001 | 340/506 |
| 2015/0218888 A1* | 8/2015 | Schonberger | E21B 44/00 | 175/24 |
| 2015/0264630 A1* | 9/2015 | Saska | H04W 48/02 | 370/230 |
| 2015/0348051 A1* | 12/2015 | Bodda | G06Q 30/016 | 705/304 |
| 2015/0356579 A1* | 12/2015 | Brondstetter | G06Q 30/0203 | 705/7.32 |
| 2015/0369640 A1* | 12/2015 | Schulze | H01L 21/67253 | 702/183 |
| 2016/0170395 A1* | 6/2016 | Farrell | G06Q 10/06 | 700/79 |
| 2016/0300474 A1* | 10/2016 | Warren | G08B 19/00 | |
| 2016/0314471 A1* | 10/2016 | Gerber | G06Q 20/4014 | |
| 2016/0344679 A1* | 11/2016 | Lane | G06F 17/212 | |
| 2017/0083390 A1* | 3/2017 | Talwadker | G06F 11/0772 | |

OTHER PUBLICATIONS

Kapella, Victor. "A framework for incident and problem management." International Network Services whitepaper (2003) (Year: 2003).*

Bhatt, Sandeep, Pratyusa K. Manadhata, and Loai Zomlot. "The operational role of security information and event management systems." IEEE security & Privacy 12.5 (2014): 35-41 (Year: 2014).*

Low et al. "Wireless sensor networks for industrial environments." International Conference on Computational Intelligence for Modelling, Control and Automation and International Conference on Intelligent Agents, Web Technologies and Internet Commerce (CIMCA-IAWTIC'06). vol. 2. IEEE, 2005 (Year: 2005).*

C. Low, Kay Soon, Win Nu Nu Win, and Meng Joo Er. "Wireless sensor networks for industrial environments." CIMCA-IAWTIC'06). vol. 2. IEEE, 2005 (Year: 2005).*

Miyazawa, Masanori, Michiaki Hayashi, and Rolf Stadler. "vNMF: Distributed fault detection using clustering approach for network function virtualization." 2015 IFIP/IEEE International Symposium on Integrated Network Management (IM). IEEE, 2015 (Year: 2015).*

* cited by examiner

| Parameter | Value |
|---|---|
| Milling machine capacity | 10 units/min. |
| Joining machine capacity | 8 units/min. |
| Man hours required to complete Workorder 0856201 | 12 hours |
| Assembly | 7 hours |
| Milling machine | 10 units/min. |
| Finishing | 4 hours |
| Inspection | 1 hour |

CASCADING NOTIFICATION SYSTEM

FIELD OF THE INVENTION

The field of the invention is scheduling and decision making systems.

BACKGROUND OF THE INVENTION

In manufacturing and other applications, scheduling and decision making systems use computers to manage the increasing quantity of data. Traditionally, the cost of data storage was relatively expensive, but today the cost of storing data is so low that in most instances the quantity of data is not cost prohibitive. What can be cost prohibitive, however, is the time and effort required to filer the data and to get relevant information to the appropriate user in a timely manner.

In batch systems, filtering of data can be accomplished either automatically or manually. Automatic filtering may take the form of an instruction hard coded in a program, an input parameter to a program (e.g. a selection criteria), or a routing instruction that instructs the system to route particular output to a particular user. Manual filtering of data is generally performed by a person and can be as simple as discerning the appropriate user to receive a computer generated report and giving the report to that user. Systems which utilize manual filtering may also utilize bins or mail boxes that store hard copy reports for an associated user. A persisting problem, however, with batch systems, is that massive reports are often created and much of the information in the report is either superfluous, out-dated, or intended for more than one user.

Online reporting and display of data alleviated some of the problems associated with massive hard copy reports and timeliness of data by allowing users to view real time or near real time data using a display screen. Additionally, online systems empowered users with the ability to make decisions that more accurately reflected current conditions. Still, there were problems getting the right information to the right person at the right time. At times, the right person was not available or access to the right information was limited. Even still, there were instances in which too much information was available and this added to the time needed to make a timely decision. There remains a need for improved scheduling and decision making systems and methods which facilitate getting the right information to the right people at the right time.

SUMMARY OF THE INVENTION

The inventive subject matter herein is directed toward improved scheduling and planning system in which computer implemented software uses a hierarchical selection list to select at least one of a plurality of unconnected users and contact the selected user(s) as a function of an event. Unconnected means that the user is not physically situated such that online access to the scheduling system is readily available. For example, an unconnected user may be a user of the scheduling system who is physically located outside the local network, a supplier of a product used by the scheduling system, or a customer of the entity controlling the scheduling system.

Generally, the computer-operated contacting device first receives information from a sensor that is configured to detect one or more sets of information about one or more problematic workflow events. Such sensors could be used, for example, in assembly line systems to inspect a product and determine whether one or more quality standards have been met. In some embodiments a sensor could comprise a user interface to a computer system through which a human user could manually enter information about a problematic workflow event, such as through a keyboard or touch screen device. Preferably, the sensor is coupled to a computer and is configured to detect at least a portion of the information sent to the computer-operated contacting device. One or more sensors could send information concerning one or more problematic workflow events. For example, a camera viewing an area related to the problematic workflow event, a pressure plate detecting the presence of a material in an area related to the problematic workflow event, and a user interface that accepts input from a human user observing a portion of the problematic workflow event. Such sensors are disclosed in co-pending and co-owned U.S. patent application having Ser. No. 12/236,328 filed on Sep. 23, 2008, which is herein incorporated by reference in its entirety. Where a definition or use of a term in an incorporated reference is inconsistent or contrary to the definition of that term provided herein, the definition of that term provided herein applies and the definition of that term in the reference does not apply.

It is contemplated that an event may cause a scheduling or decision making problem. Such an event may include the failure of a machine, the absence of an employee, the shortage of a raw material, and so on. In some embodiments, a sensor might detect the amount of a material in an area monitored by the sensor, and a computer system analyzing the sensor data could trigger an alert when the sensor detects that the amount of material in the area has fallen below a given threshold. In some embodiments, such an alert could be an automatic transmission of a request to deliver some of the material to a destination, such as a transmission of an order for a store to deliver the material or a transmission of an order to move the material from storage to another location.

A system administrator preferably saves a hierarchical contact list in a memory of the computer scheduling system. As used herein, a "hierarchical contact list" comprises a list of contacts wherein contacts are organized via a hierarchy, designating a first contact that is of a higher status than a second contact. Generally, a higher contact has two or more contacts below it, although a purely vertical hierarchical contact list could be used without departing from the scope of the current invention.

A computer system preferably analyzes sensor data received from one or more sensors that transmit information about the problematic workflow event and, from that information, determines the existence of one or more problematic workflow events, as well as one or more potential severities associated with the problematic workflow event. The computer system could also be configured to correlate one or more potential severities with information about the problematic workflow event. As used herein, a "potential severity" of a problematic workflow event indicates how serious the problem might be, in light of the information received by the sensor(s).

With regard to hierarchy, a selection list advantageously correlates a plurality of users with a severity of a problem. Correlation of a user with a severity of a problem may include selecting a user that is most appropriate to solve a particular problem. For instance if the problem is a shortage of a raw material that will cause a delay in production of a product for an important customer, it may be appropriate to select a purchasing manager who can leverage his position with vendors to get expedited delivery of a product. In preferred embodiments, the computer system selects a set of contacts from the hierarchical contact list using one or more potential severities correlated with the problematic workflow event.

A selection list may alternatively and/or additionally correlate contacts with one or more contacting methods. By adding a further layer of correlation, it may be easier to contact the appropriate person to solve a particular problem or address a particular event. Thus, hierarchical selection may include multiple layers (tiers) of correlation in which users are correlated with a type of problem, one or more severities of the problem, and one or more contacting methods.

The computer system preferably automatically makes attempts to notify each of the selected set of contacts. In some embodiments, the system could first prioritize each of the selected contacts relative to one another, so that the system knows which contacts should be notified first. Then, the system could notify each of the contacts as a function of its priority, typically contacting the highest priority contacts first using the highest priority contacting method, and then making its way down the list, automatically escalating through the contacting methods, as certain contacting methods fail to trigger a response from the contact.

As the contacts system attempts to notify each of the selected contacts, some of the contacts will transmit responses to the system. Any suitable manner of response is contemplated. For example, a contact could transmit a text message, email, or could simply call a dispatch office in response to the notification. Other contacts may be unavailable. In some embodiments, if a contact fails to respond within a threshold of time, for example 1 minute, 5 minutes, 30 minutes, 1 hour, 2 hours, 3 hours, 1 day, 3 days, or even a week, the system will consider that failure to be an unavailable response. In some embodiments, the system could be configured to generate a plurality of unavailable responses. For example, the system could generate a 5 minute unavailable response when 5 minutes have passed, a 10 minute unavailable response when 10 minutes have passed, and a 30 minute unavailable response when 30 minutes have passed. In some embodiments, an alarm could be triggered when a contact fails to respond within a threshold period of time. Contemplated alarms include sonic alarms, visual alarms, and notifications transmitted to a second set of contacts selected in the hierarchical contact list.

In some embodiments, a contact might be associated with a plurality of contacting methods in the hierarchical contact list. In such situations, when the system generates an unavailable response for one contacting method, the system might try another contacting method. Preferably, each of the contacting methods for a contact are ranked relative to one another, such that some contacting methods have higher priorities than other contacting methods. The system could make attempts to notify the contact as a function of the priority of each contacting method, and one or more responses to the attempt to notify the contact. In other embodiments, a type of problem and/or a severity of the problem might have a plurality of contacts in the hierarchical contact list. In such situations, when the system generates an unavailable response for a contact using each of the contact's contacting methods, the system might make an attempt to notify another contact associated with the type of problem and/or a severity of the problem. Preferably, each of the contacts are ranked relative to one another, such that some contacts have higher priorities than other contacting methods.

Responses to an attempt to notify a client could trigger yet another problematic workflow event. For example, the system could determine that a key contact person is not reachable or is otherwise unavailable, such as a repairman for a broken machine, or a contact might report that a key component is unavailable, such as a replacement part to fix the broken machine. The system could analyze responses of attempts to notify a contact, and determine whether a response is indicative of a second problematic workflow event. The system could then generate a set of information about the second problematic workflow event and attempt to solve that problem by selecting other contacts as a function of information associated with the second problematic workflow event, such as the type of problem, severity of the problem, and so forth. In such a manner, a single detected problematic workflow event could trigger a cascade of detected problematic workflow events as the system attempts to notify contacts from a hierarchical contact list. The system is preferably configured to select a second set of contacts as a function of the information received about the second problematic workflow event. In some embodiments, the system prioritizes each of the second set of contacts as a function of the type or problem and/or severity of the problem, and notify each of the second set of contacts as a function of the selected priority.

The system could include a scheduler that reschedules a task for an entity as a function of information received about the second problematic workflow event. For example, if the system attempts to notify a first contact regarding the first problematic event and, in response, the system detects that the first contact is unavailable, the scheduler could reschedule a task for a second contact and then could automatically transmit the new rescheduled task to the second contact. In another embodiment, if the system attempts to notify a first contact regarding the first problematic event and, in response, the system detects that a machine in an assembly line is unavailable, the scheduler could reschedule a task for the assembly line, and could notify a second contact to reschedule that assembly line task. At least some of the information regarding the second problematic event could be transmitted by the contact being notified by the system.

Another aspect of the inventive subject matter includes an improved decision and/or scheduling system that has soft fields for describing resources. As used herein, a "soft field" is a field that is created dynamically by a user. Thus, not only do users input values for fields, but they actually create fields. In some embodiments, soft fields will be sortable and/or searchable by the computer system, enabling users to further define the type and extent of the data they wish to receive. It should be noted that soft fields may be used for locations, processes, materials, or most any resource.

Hierarchical soft field configuration can be useful in almost any planning and/or scheduling system, especially those that assume limited requirements such as ERP (enterprise resource planning), MRPII (manufacturing resource planning), and so on.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
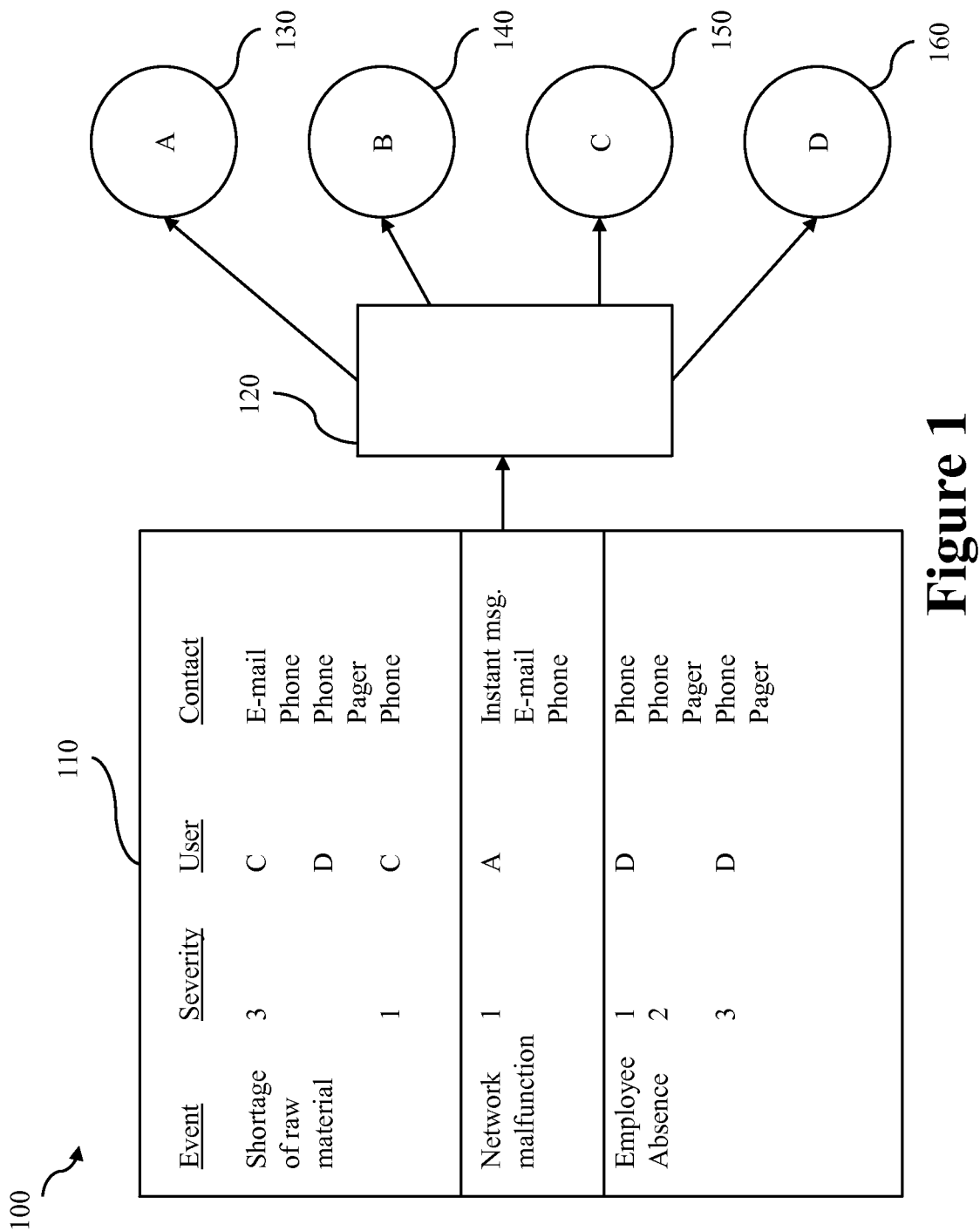
FIG. 1 is a schematic of a hierarchical selection list of an event driven scheduling system.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including the ability to trigger a cascade of notification events that dynamically changes in response to previous notification events.

In FIG. 1, an event driven scheduling system 100 generally comprises a hierarchical selection list 110, computer implemented software 120, and a plurality of unconnected users 130-160.

A scheduling system is a manipulation of data which results in a planned task. The manipulation of data typically includes input, utilization, and display of data, and the planned task typically includes a description and time of performance for the task.

A preferred hierarchical selection list can take the form of a hardcopy list or a virtual list, but either way, a hierarchical aspect of the list includes levels of data items that have some sort of relationship (e.g. chain or pointer) to one another. The hierarchical selection list 110 of FIG. 1, for instance, has a relationship between an event, a severity of a problem or event, an unconnected user, and a contact method. In a preferred class of embodiments, hierarchy includes a step down approach that begins with an event which correlates to a severity of a problem which further correlates to an unconnected user and finally to a plurality of contacting methods for contacting the unconnected user.

A hierarchical selection list 110 has fields for event, severity, user, and contact. It should be appreciated that additional, fewer, or other fields may be part of a hierarchical selection list. For example, it may be useful for a hierarchical selection list to have a field to indicate whether an affected customer is a preferred or important customer. Another example of a field that can be added to a hierarchical selection list is e-mail address, phone number, pager number, etc. . . . . While such fields may be maintained in a file other than one of those associated with the hierarchical selection list, it may be advantageous to have those fields in a file associated with a hierarchical selection list.

A computer implemented software 120 is a set of computer interpretable instructions. The computer implemented software 120 uses the hierarchical selection list 110 to select at least one of a plurality of users and contact the selected user(s) as a function of an event. It is contemplated that a computer includes a desk top device, a notebook, a PDA, a cell phone, and so on.

Unconnected users 130-160 are those users of the scheduling system that are not physically situated such that access to the scheduling data is readily available. For example, an unconnected user may be a user of the scheduling system who is physically located outside the local network, a supplier of a product used by the scheduling system, or a customer of the entity controlling the scheduling system.

Consider the following example with reference to FIG. 1. A foreman on the shop floor of a manufacturing company is notified that an unexpected shortage of a raw material has occurred (an event, also sometimes referred to as a problem). The event is either manually entered into the scheduling system 100 or is automatically sensed or detected by the system or a related module, but in any case the system 100 has been notified of the event. A severity of the problem is either manually input or automatically determined by the system or some related module. It should be pointed out that sensing of an event and its associated severity can be accomplished using a sensing device (e.g. optical or electro-mechanical). Sensors can also be used to inspect products to determine whether quality standards have been met.

Continuing this example, within a short time (2, 10, 30 seconds) of notification of the event, the computer generated software 120 selects a user or set of users and correlates the user or users with the severity. In this case, say the severity is 3 (a high severity). Thus, user C 150 is selected as a function of the event and severity.

Contemplated methods of contact can include pager, cell phone, e-mail, instant message, broadcast to a mobile telematics device, and messenger. In this example, the optimal method of contacting user C 150 for this severity and this event is by e-mail. Preferably, the system 100 generates an e-mail to user C 150 advising her of the problem. It is contemplated that an e-mail or other message can contain information such as the event, the severity of the problem, the customer involved, a work-order number, the due date of the scheduled task, the time of the problem, the users contacted, threshold time to respond, and soft fields information (discussed infra). Additionally, it may be advantageous to utilize a backup contact method (e.g. phone) if the primary (e.g. e-mail) method of contact is not responded to within a maximum threshold of time. A backup or secondary user can also be contacted. In other embodiments, more than one user can be contacted simultaneously and/or more than one method of contacting can be used simultaneously. Thus, user D can be an additional primary user or a secondary user depending on parameters that are input to the system.

Figure 2:
FIG. 2 is a schematic of a hierarchical soft field list.

Referring now to FIG. 2, an improved decision and/or scheduling system generally comprises a data model 200 having soft fields for describing resources. These soft fields are also referred to herein as parameter/values with the parameter equating to the type of resource and the value equating to the data contained in the field. Thus, an exemplary parameter/value pair is "maximum temperature/32° F.".

A soft field is generally created by a user through use of a dynamic schema utility. It should be noted that a soft field involves more than mere initialization of a pre-existing field on a database schema, it involves the creation of such a field. Soft fields are used to give users flexibility in determining the fields they use to describe resources. Moreover, use of soft fields reduces the number of fields that are not used (i.e. contain blanks). In some embodiments, soft fields will be sortable and/or searchable enabling users to further define the type and extent of the data they wish to receive. It should be noted that soft fields may be used for most any resource including location, process, material, man hours, and so on.

Hierarchical soft field configuration can be useful in almost any planning and/or scheduling system, especially those that assume limited requirements such as ERP (enterprise resource planning) and MRPII systems. Hierarchical soft fields can be used to store information that is included in a message sent to a user as a function of an event.

Display of parameters is typically accomplished using scroll down menus. By reviewing the items displayed in the scroll down menu, one can determine whether a particular parameter has already been established. It should be noted that multiple entries can exist having the same parameter, as long as the associated value is different. For example, parameter/value "milling machine capacity/10 units/min" can co-exist with a parameter/value entry of "milling machine capacity/4 units/min". It is contemplated that a user of the system will determine which of the parameter/value pairs is appropriate for a given entry.

Figure 3:
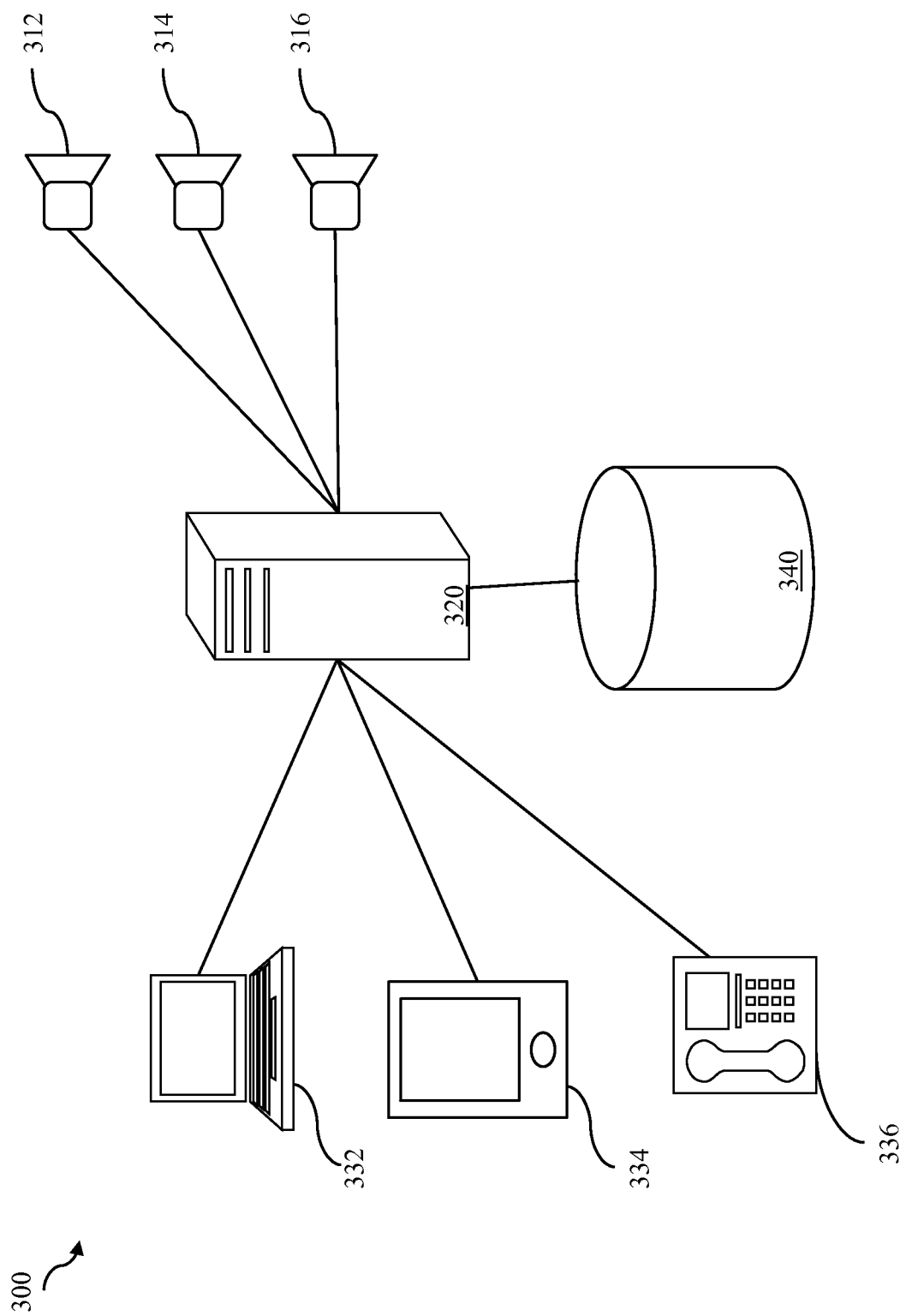
FIG. 3 is a hardware schematic of an event driven scheduling system.

FIG. 3 shows a hardware schematic of a system 300 having a set of sensors 312, 314, and 316, each configured to detect information about one or more problematic workflow events. Contemplated sensors include, for example, optical sensors, electro-mechanical sensors, temperature sensors, accelerometers, barometers, cameras, pressure plates, laser sensors, etc. Information detected by the sensors is sent to computer system 320, which generally has a computer processor and a memory with software instructions configured to process the information received by sensors 312, 314, and 316, and send notifications to one or more contacts. Database 340 holds information regarding potential problematic workflow events, and information regarding how the system should handle detected problematic workflow events. Database 340 typically holds one or more hierarchical contact lists that provide instructions regarding making attempts to notify one or more contacts as a function of information regarding a detected problematic workflow event. Notifications could be sent to contact devices 332, 334, and 336, shown euphemistically as a computer terminal 332, a computer tablet 334, and telephone 336. Other suitable contact devices could be functionally coupled to computer system 320, such as mobile phones, alarms, and pagers, without departing from the scope of the invention.

System 300 shows computer system 320 functionally coupled to sensor 312, sensor 314, sensor 316, database 340, contact device 332, contact device 334, and contact device 336. As used herein, a computer system that is "functionally connected" to other computer devices is a computer system that is configured to transmit digital and/or analog information from and/or to another computer device, either through a wired interface or through a wireless interface.

Figure 4:
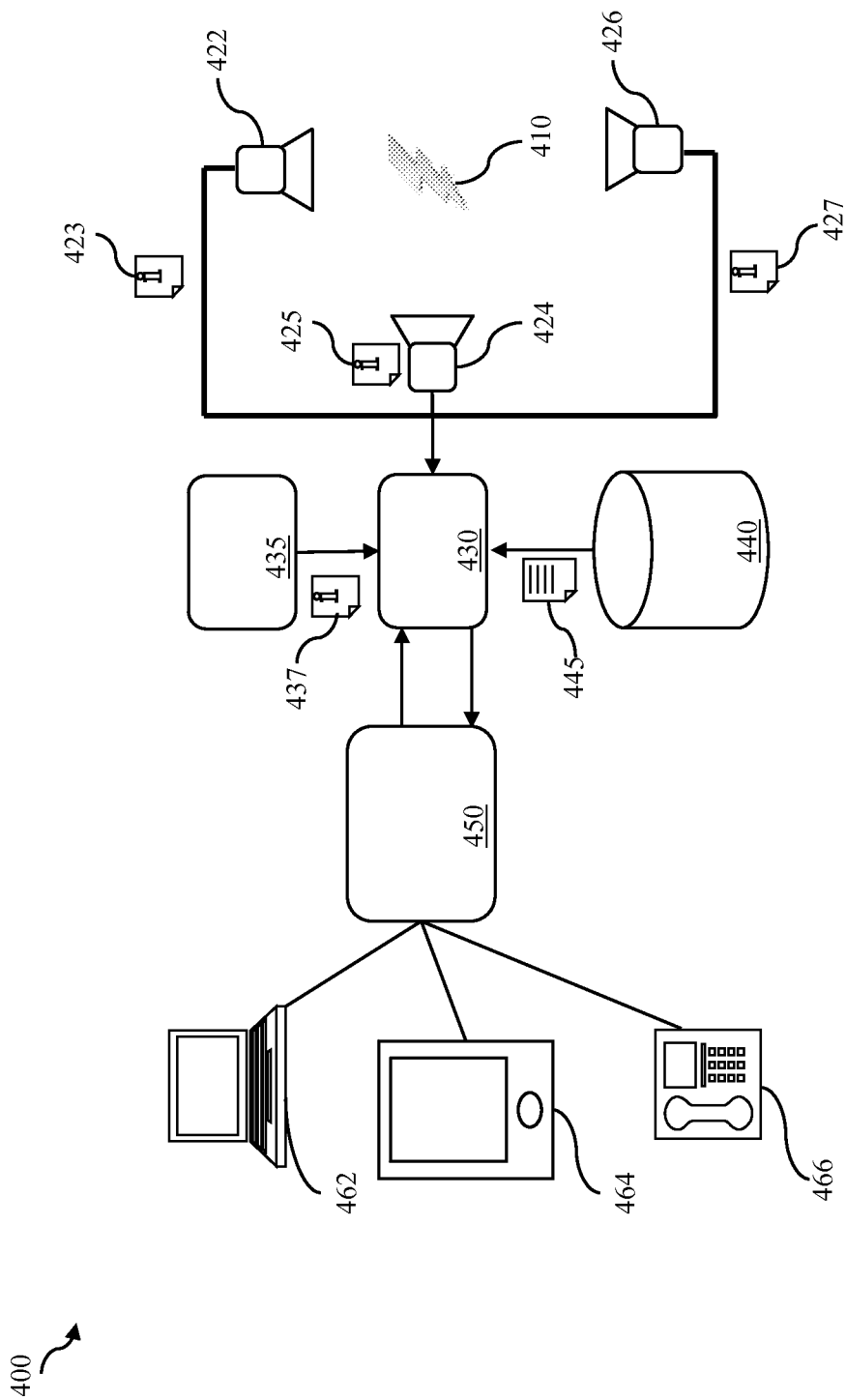
FIG. 4 is a software schematic of an event driven scheduling system.

FIG. 4 shows a software schematic of a system 400 having a problematic workflow event 310 that is monitored by sensors 422, 424, and 426, which each transmits information 423, 425, and 427, respectively, to problematic workflow module 430. Three separate sensors, 422, 424, and 426, are shown to monitor a single problematic workflow event 310, but more or less sensors could be used without departing from the scope of the invention. Problematic workflow module 430 is configured to analyze information 423, 425, and 427, to determine whether a potential problematic workflow event has occurred. Typically, problematic workflow module 430 is configured to detect the existence of a potential problematic workflow event when received information passes a threshold, for example where the weight of a material on a shelf falls below a given threshold (e.g. 20 lbs. or 10 lbs.) or where the temperature of a machine exceeds a given threshold (e.g. 80 degrees or 90 degrees). Once a potential problematic workflow event has been detected, problematic workflow module 430 could glean additional information 437 from environmental information module 435. Environmental information module 435 is configured to provide environmental information ancillary to the problematic workflow event, such as a time that the problematic workflow event occurred, the presence or absence of factors that could contribute to the problematic workflow event (e.g. collected from logs available to the computer system or from other sensors), or the presence or absence of factors that could solve the problematic workflow event.

Problematic workflow module 430 could then select one or more hierarchical contact lists 445 from database 440 as a function of some of the information collected concerning the problematic workflow event, and could further select one or more sets of contacts as a function of some of the information collected concerning the problematic workflow event. Problematic workflow module 430 then attempts to notify each of the selected contacts via transmission module 450, which is configured to send, and possibly receive, notifications to/from contacting devices 462, 464, and/or 466. Information about other problematic workflow events triggered by one or more of the notifications could then be sent to transmission module 450, which passes that information onto problematic workflow module 430 which, again, selects a set of contacts as a function of the new information received about the new problematic workflow event.

Figure 5:
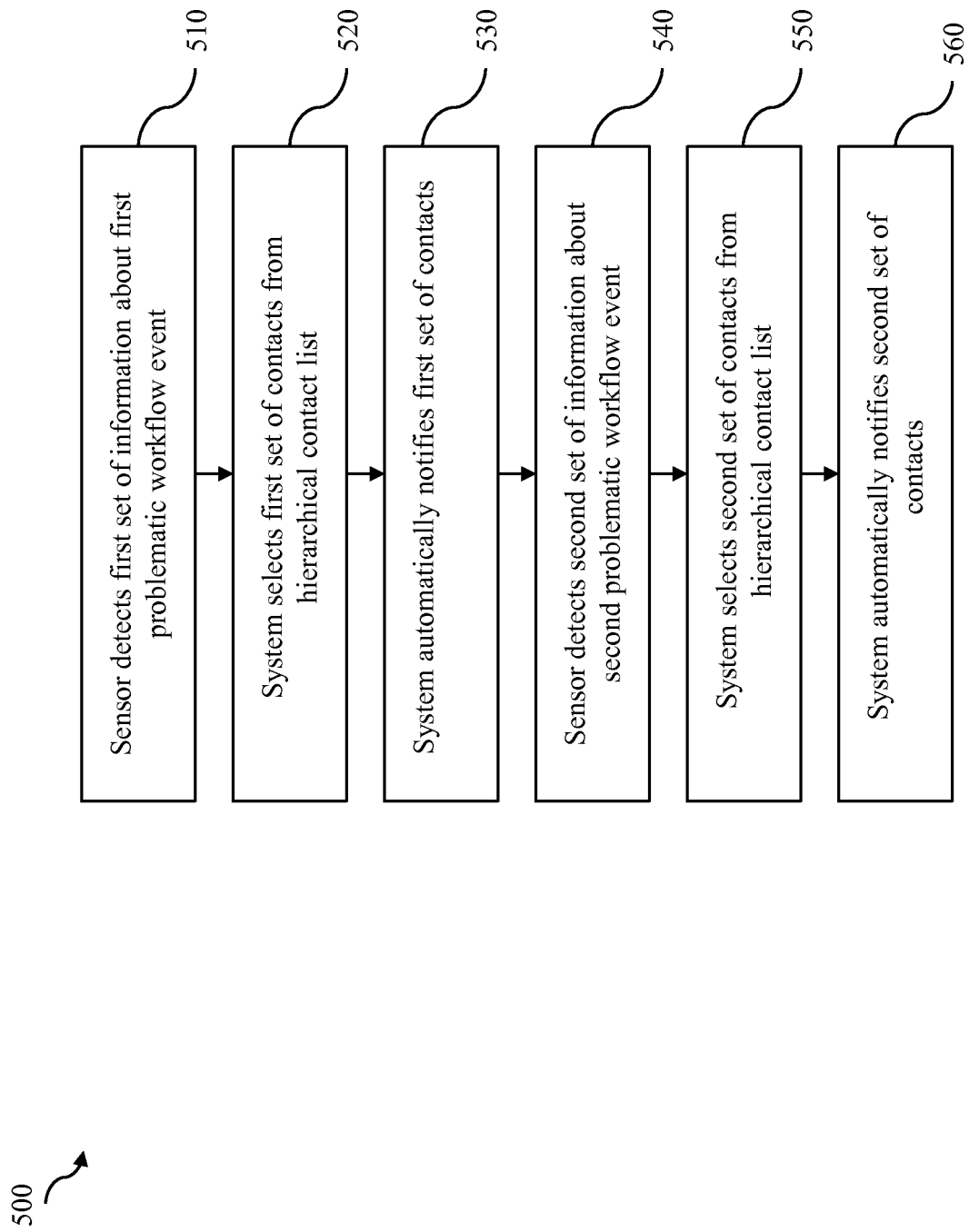
FIG. 5 shows a method of triggering cascaded responses to detected problematic workflow events.

FIG. 5 shows an exemplary method 500 for providing a cascading event notification system. In step 510, a sensor of the system detects a first set of information about a first problematic workflow event. Some of that information is typically received by a sensor, while other information could be collected by the system in response to the collected sensor information. For example, a sensor could detect that a machine is malfunctioning, and, in response, the computer system could poll other modules and/or other devices to collect information related to the malfunctioning machine, such as detecting the time-stamp of when the fault occurred, detecting the temperature of the machine, and detecting the last known location of a repair maintenance staff. In other words, while the set of information detected about the first problematic workflow event could trigger the system to collect a full set of information related to the first problematic workflow event.

In step 520, the system selects a first set of contacts from a hierarchical contact list as a function of at least some of the full set of information collected about the first problematic workflow event, such as a type of the problematic workflow event and/or a severity of the problematic workflow event. The hierarchical contact list could be saved in a database that associates contacts with types of notifications for each type of problematic workflow event, and for each severity of each type of problematic workflow event. Typically, the system could be configured to compare at least some of the full set of information, such as the type of the problematic workflow event and/or a severity of the problematic workflow event, against the hierarchical selection list to determine who to contact, how to contact that entity, and what type of notification to deliver to that entity.

Then, in step 530, the system automatically attempts to notify the first set of contacts, typically escalating through each contact method for each contact until that contact has been notified, or the system detects that the contact is unreachable via that contacting method. For example, where the system detects that a machine is broken having a severity of 3, the system could then consult the hierarchical selection list, which would inform the system to first contact a maintenance person with a request to fix the machine by email, then contact the maintenance person with a request to fix the machine by phone if there is no response via email within 30 minutes, then contact the maintenance person's supervisor by phone if there is no response via phone, and then contact the maintenance person's supervisor by pager if there is no response via phone. As used herein, a notification could be as simple as a delivery of a message, or could be as complex as a series of tasks that are performed in association with the contact. For example, a notification could be a rescheduling of an employee's tasks via a computer interface and an email sent to the employee indicating what tasks have been rescheduled.

In step 540, the system detects a second set of information about a second problematic workflow event in response to at least one of the attempts no notify one of the first set of contacts. While some of that information could be received by a sensor and/or a contacting device (e.g. a mobile phone that the system transmitted the notification to), some of the information could also be collected by the system in response to the information received by the sensor and/or contacting device. For example, if the system contacts a maintenance person via email, and the maintenance person response that the repair will occur in 2 days, the system has received information that the machine will remain broken for at least two days. This could trigger another action by the system to glean more information about the machine.

In step 550, the system selects a second set of contacts from the same, or a different, hierarchical contact list, and against automatically attempt to notify the second set of contacts, again typically escalating through each contact method for each contact until that contact has been notified, or the system detects that the contact is unreachable via that contacting method. For example, if the system detects that a machine will remain broken for at least two days, the system could be configured to reschedule tasks for individuals around the broken machine. The system could do this by first analyzing the hierarchical contact list to determine that, in the event of a machine being broken for at least two days, the system should reschedule tasks for users A and B. The system informs the scheduler that tasks for users A and B should be rescheduled, and the scheduler returns new schedules for users A and B. Then the system transmits the new schedule for user A to user A via escalating contacting methods until user A confirms receipt and acceptance of the new schedule, and the system transmits the new schedule for user B to user B via escalating contacting methods until user B confirms receipt and acceptance of the new schedule.

Additional information about additional problematic workflow events could be received by the system in response to the second set of notifications, cascading through reactions to detected information. In the above example, user B may never confirm receipt and acceptance of the new schedule. Such a lack of response triggers the system to detect that user B is not adhering to the new schedule, and the system analyzes the hierarchical contact list to determine who to contact when user B fails to adhere to a new schedule as a result of a machine being broken. The hierarchical contact list informs the system (for example via a spreadsheet) that user C should be given the rescheduled tasks of user B. The system then transmits the new schedule of user B to user C via escalating contacting methods.

In some embodiments, the system could detect that a material is missing. The system could then automatically reschedule user tasks to avoid using the missing material for a time, notifying each user of the rescheduled task, while communicating to a customer that an order may be delayed, and transmitting a transfer order to warehousing to fetch more material. Warehousing might then respond informing the system that there is not enough material in storage, and in response the system could then automatically transmit a purchase order to a seller to purchase more material, and could communicate to the customer that the order will be delayed longer than originally anticipated.

In some embodiments, the system could receive an alert from a surgeon that a surgical machine has gone bad during an operation. The system could request that a replacement machine be moved from a neighboring operating room, and could notify the next operating patient that the operation will be delayed by an hour, and reschedule other patients waiting to see the operating surgeon to other doctors and notify both the patients and the other doctors of the rescheduling. One of the patients might then inform the system that the patient is unable to follow the new schedule, and the system could then query the patient to determine a new schedule that works for the new patient, and reschedule the patient accordingly.

Thus, specific embodiments and applications of scheduling and decision systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A scheduling system, comprising:
   a first sensor configured to detect a first set of information about a first problematic workflow event associated with a problematic machine;
   a second sensor coupled to a peripheral machine;
   a computer-operated controller, wherein the computer-operated controller is configured to:
   in response to detecting the first set of information about the first problematic workflow event, obtain a set of environmental information related to the first problematic workflow event, wherein the set of environmental information comprises information ancillary to the first problematic workflow event;
   determine a category of the first problematic workflow event based on the first set of information and the set of environmental information;
   in response to determining the category of the first problematic workflow event, determine a severity of the first problematic workflow event;
   send a first set of machine instructions to control operation of the peripheral machine operatively coupled to the problematic machine, wherein the first set of machine instructions cause the second sensor to analyze a deficiency of the problematic machine;
   in response to the analyzed deficiency of the problematic machine and the environmental information, receive a parameter/value entry through use of a dynamic schema utility, wherein the parameter equates to a type of resource and the value equates to data contained in a soft field of a data model;
   select a first set of contacts from a hierarchical contact list as a function of the severity correlated with the first set of information about the first problematic workflow event associated with the problematic machine;
   prioritize the first set of contacts based on the severity;
   automatically escalate through each of the first set of contacts according to their priority by making an attempt to notify each of the first set of contacts, wherein making the attempt to notify each of the first set of contacts comprises automatically escalating through a first series of contact methods for at least one of the first set of contacts, wherein the first set of contacts are associated with a set of contact priorities for each contact of the first set of contacts, and wherein the set of contact priorities ranks and prioritizes the contact methods,
   wherein the automatically escalating through each of the first set of contacts and corresponding contact methods continues until a response is received from a first contact from the first set of contacts;
   receive a response from the first contact from the first set of contacts regarding the first problematic workflow event;
   initiate an a process to solve the problematic workflow event based on the response;
   during the escalating through the first set of contacts, detect a second problematic workflow event has occurred and generate a second set of information about the second problematic workflow event, wherein the detecting is based on a response from one or more contacts from the first set of contacts regarding the first problematic workflow event, wherein the response from the one or more contacts from the first set of contacts comprises a response indicating a delay in repairing the problematic machine and the second problematic workflow event arises from the delay;
   select a second set of contacts from the hierarchical contact list as a function of a second potential severity associated with the response from the one or more contacts from the first set of contacts regarding the first problematic workflow event;
   automatically make an attempt to notify each of the second set of contacts about an updated workflow by automatically escalating through a second series of contact methods for at least one of the second set of contacts;
   alter a schedule of at least one of the second set of contacts as a function of a signal that indicates that the second sensor has detected less than a threshold amount of material; and
   transmitting the altered schedule to the at least one of the second set of contacts.

2. The scheduling system of claim 1, wherein the first sensor comprises a user interface through which a human user manually enters a portion of the first set of information.

3. The scheduling system of claim 1, wherein the first sensor comprises a computer sensor configured to detect at least a portion of the first set of information.

4. The scheduling system of claim 1, wherein the first sensor comprises a sensor configured to inspect a product to determine whether quality standards have been met.

5. The scheduling system of claim 1, wherein the computer-operated controller is further configured to reschedule a task for an assembly line for at least one of the second set of contacts, wherein the step of automatically making the attempt to notify each of the second set of contacts comprises transmitting a rescheduled task to the at least one of the second set of contacts.

6. The scheduling system of claim 1, wherein the computer-operated controller is further configured to receive the response to the attempt to notify each of the first set of contacts as a transmission of at least a portion of the second set of information from the at least one of the first set of contacts.

7. The scheduling system of claim 1, wherein the response to the attempt to notify at each of the first set of contacts comprises an alarm triggered when the at least one of the first set of contacts fails to respond within a threshold period of time.

8. The scheduling system of claim 1, wherein the computer-operated controller is further configured to reschedule a task of at least one of the second set of contacts as a function of the second set of information.

9. The scheduling system of claim 8, wherein the computer-operated controller is further configured to automatically make the attempt to notify each of the second set of contacts by transmitting the rescheduled task to the at least one of the second set of contacts.

10. The scheduling system of claim 1, wherein the computer-operated controller is further configured to select the second set of contacts from the hierarchical contact list as a function of the second set of information.

11. The scheduling system of claim 1, wherein the computer-operated controller is further configured to prioritize each of the second set of contacts as a function of the second potential severity and wherein the computer-operated controller is further configured to automatically make an attempt to notify each of the second set of contacts as a function of its priority.

12. The scheduling system of claim 1, wherein the at least one of the first set of contacts comprises a third sensor configured to detect the threshold amount of the material, and wherein the response to the attempt to notify each of the first set of contacts comprises a signal that indicates that the third sensor has detected less than the threshold amount of the material.

13. The scheduling system of claim 12, wherein the computer-operated controller is configured to, upon receiving the signal that indicates that the third sensor has detected less than the threshold amount of the material, automatically transmit a request to deliver some of the material.

14. The scheduling system of claim 1, wherein the second problematic event occurs as a result of a non-response from the one or more contacts.

* * * * *